3,357,708
LABYRINTH SEAL
Max O. Parr, Indianapolis, Ind., assignor to General Motors Corporation, Detroit, Mich., a corporation of Delaware
Filed Sept. 17, 1965, Ser. No. 488,206
9 Claims. (Cl. 277—56)

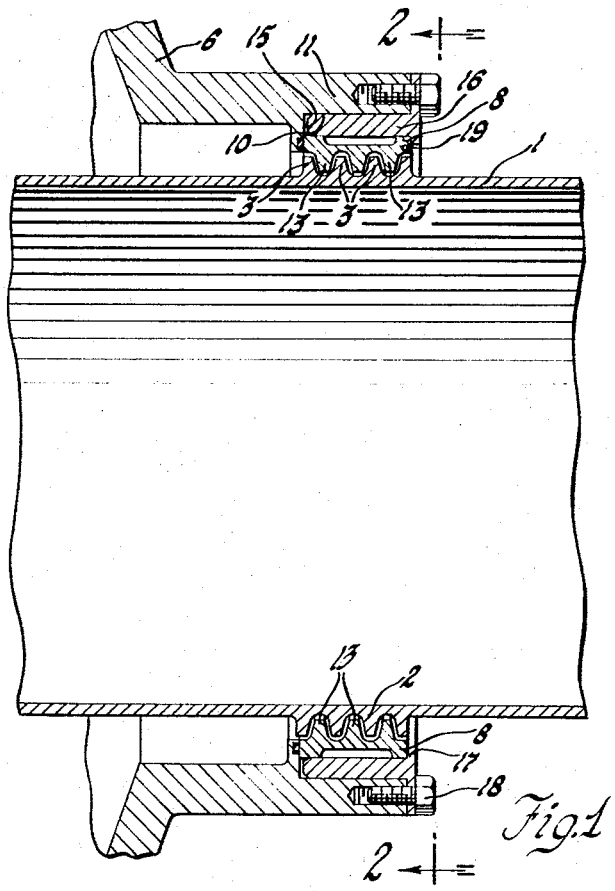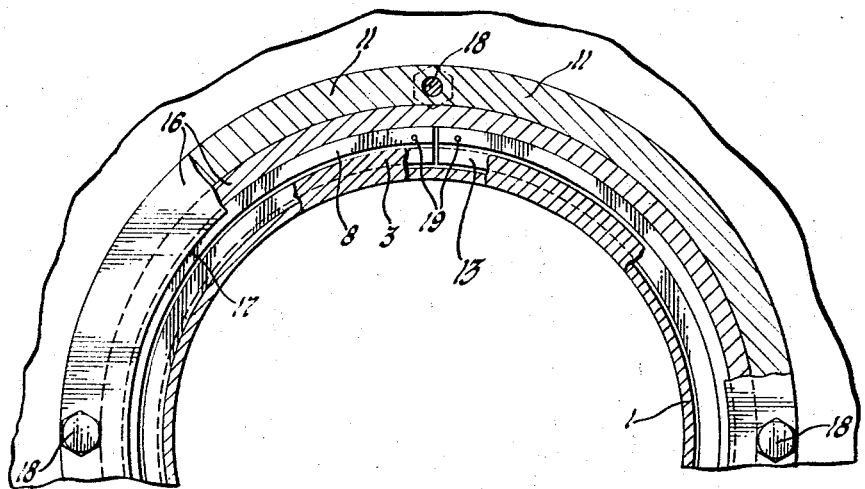
Fig.1
Fig.2

ABSTRACT OF THE DISCLOSURE

A labyrinth seal in which the outer member is a split ring so that its ridges may be aligned with the valleys between the ridges on the inner seal member without disturbing the environmental parts of the seal. Once aligned, the diameter of the outer ring is decreased to form the labyrinth seal and a positioner ring is placed between the outer ring and its mounting bore to retain the outer ring in its operative position.

My invention is directed to labyrinth seals. By virtue of the invention, it is possible to provide a generally cylindrical or annular labyrinth seal having an inner member with flanges of greater diameter than the minimum diameter of the flanges or ridges on the outer member. This overlap provides advantages in the functional characteristics of such seals and, structurally, this result can be obtained very simply and inexpensively. The inner member of the labyrinth seal may be of integral construction with a rotating shaft while the seal member is very simply disassembled and removed from the stationary member without moving or disturbing either the inner member or the shaft on which it is mounted.

The nature of the invention and its advantages will be clear to those skilled in the art from the succeeding detailed description of the preferred embodiment of the invention and the accompanying drawings thereof wherein:

FIGURE 1 is a view of a labyrinth seal in accordance with my invention taken in a plane containing the axis of the seal.

FIGURE 2 is an end view taken on the plane indicated by the line 2—2 of FIGURE 1.

Referring to the drawings, a rotatable shaft 1 has an integral sleeve 2. The sleeve 2 has a number of circumferential ridges 3 which provide baffles in an annular labyrinth seal between the shaft 1 and a stationary member 6, which might be the housing or case of an engine, for example. The outer portion of the labyrinth seal is defined by a split ring 8 disposed in a cylindrical recess 10 in an internally flanged portion 11 forming part of the stationary member 6. Ring 8 has flanges 13 alternating with ridges 3. It will be noted that the maximum diameter of ridges 3 is considerably greater than the inside or minimum diameter of the flange portions 13 of the ring 8. The ring 8 is in abutment with the inner radial shoulder 15 of the internally flanged portion 11 of the stationary member 6. It is retained between the radial shoulder 15 and an inwardly extending flange 17 on a positioner ring 16 which is disposed in the cylindrical recess 10 radially between the boss 11 and the ring 8. The ring 8 is held compressed in its operative or sealing diameter by its fit in the positioner ring 16 which is secured to the stationary member 6 by bolts 18.

To disassemble the seal, the positioner ring 16 is first removed, whereupon the ring 8 will expand radially to its assembly or in this case, its disassembly diameter. With the ring 8 expanded radially, the minimum diameter of the ridges 13 are at least as great as and preferably slightly larger than the maximum diameter of the ridges 3. The ring 8 may now be removed from the recess 10 by translating it to the right, the flanges 13 being able to pass over the ridges 3. Once out of the recess, ring 8 may be removed over the end of shaft 1.

To assemble the seal, the ring 8 in its spread or assembly diameter is inserted into recess 10 until it abuts shoulder 15. A tool is inserted into spanner holes 19 provided in the ring 8 and the resilient ring 8 is compressed to its operative diameter. The positioner ring is then inserted into recess 10 between the boss 11 and the ring 8. The tool is removed from the spanner holes and the positioner ring is bolted to member 6.

Thus it can be seen that I have invented a labyrinth seal in which the stationary part has a minimum diameter which is greater than the maximum diameter of the rotating part and which may be removed without disturbing the rotating part.

It will be apparent that the ridges 3 may be on a sleeve which is separable from the shaft 1 rather than an integral part of shaft 1. It will also be apparent that the split ring 8 could be designed so as to be its normal size in its operative condition, although this does not appear to be as feasible as the structure shown. In such a structure, the ring 8 would be expanded during assembly to fit over the ridges 3 and then released in place to a natural operative diameter. The positioner ring 16 would then be inserted and secured as before.

It will be apparent that various modifications of structure may be made within the principles of the invention, which is not to be regarded as limited by the detailed description of the preferred embodiment.

I claim:

1. A labyrinth seal comprising, in combination, an outer member having an internal generally cylindrical surface, an inner member having an external generally cylindrical surface disposed within the said internal surface, circumferential ridges defining labyrinth seal members on said inner member and extending from the said surface thereof, a resilient demountable split ring mounted on said outer member and having circumferential flanges extending from the inner surface thereof and into the grooves defined between said ridges, said ring and flanges being changeable between an operative and an assembly diameter, and means including a positioner ring disposed radially between said outer member and said split ring retaining said split ring on said outer member in its operative diameter.

2. The labyrinth seal as defined in claim 1 wherein said last mentioned means further includes an internal shoulder on said outer member, and wherein said positioner ring has an inwardly extending flange, and wherein said split ring being straddled by said internal shoulder and said inwardly extending flange.

3. The labyrinth seal as defined in claim 1 wherein said flanges on said split ring have a minimum operative diameter which is smaller than the maximum diameter of said ridges and a minimum assembly diameter which is at least as great as the maximum diameter of said ridges.

4. The labyrinth seal as defined in claim 2 wherein said flanges on said split ring have a minimum operative diameter which is smaller than the maximum diameter of said ridges and a minimum assembly diameter which is at least as great as the maximum diameter of said ridges.

5. The labyrinth seal as defined in claim 2 wherein said flanges on said split ring have a minimum operative diameter which is smaller than the maximum diameter of said ridges and a minimum assembly diameter which is greater than the maximum diameter of said ridges.

6. The labyrinth seal as defined in claim 1 wherein said split ring is in its natural state when at its assembly diameter and is compressible to its operative diameter.

7. The labyrinth seal as defined in claim 4 wherein said split ring is in its natural state when at its assembly diameter and is compressible to its operative diameter.

8. The labyrinth seal as defined in claim 1 wherein said split ring is in its natural state when at its operative diameter and is expandable to its assembly diameter.

9. The labyrinth seal as defined in claim 4 wherein said split ring is in its natural state when at its operative diameter and is expandable to its assembly diameter.

References Cited

UNITED STATES PATENTS

| | | | |
|---|---|---|---|
| 897,189 | 8/1908 | Belluzzo | 277—56 X |
| 1,187,212 | 6/1916 | Westinghouse | 277—56 X |
| 1,991,077 | 2/1935 | Brittain | 277—56 X |

SAMUEL ROTHBERG, *Primary Examiner.*